Patented Mar. 12, 1946

2,396,234

UNITED STATES PATENT OFFICE 2,396,234

METHOD OF MAKING A FOOD PRODUCT

Robert McDowell Allen, New York, N. Y., and Frederick E. Timmer, Hasbrouck Heights, N. J.

No Drawing. Application July 31, 1940, Serial No. 348,738

5 Claims. (Cl. 99—17)

This invention relates to new food products and to methods of making the same.

The primary object of the invention is to provide a profitable use for spent distillers' mash which heretofore has found no commercial use except as cattle and chicken feed. In this field where price is necessarily determined by the prevailing prices for similar foodstuffs, the profit to be realized is so small that the majority of the distillers allow the spent mash to run to waste if the location of the distillery is such that the disposal of the spent mash can be accomplished without contamination of streams or otherwise creating a public nuisance. It is in fact only where the distilleries are so located that the disposal of the mash creates a problem that any attempt is made to make industrial use of it.

Although the solids of the spent mash are high in food value, the liquid content is so great that transportation costs are prohibitive for its distribution in liquid form, while on the other hand, the cost of evaporation of such a large percentage of the liquid is too great for the dry product to be salable in competition with other cattle and poultry foods.

Attempts have heretofore been made to produce from spent distillers' mash acceptable foods and food ingredients for human consumption, but efforts in this direction have so far failed to produce a foodstuff sufficiently palatable to have any commercial value.

We have discovered that by a simple and inexpensive processing of the spent distillers' mash a palatable food or food ingredient for human consumption can be produced which is high in proteins and minerals in assimilable form and also contains all the known B vitamins in amounts comparable with the vitamin content of dried brewers' yeast.

In the ordinary distilling process the corn, rye, or other grain is cooked and the cooked starch converted by malting into maltose. The cooked and malted grain is then made into a dilute mash. Yeast is then added in sufficient quantity to ferment substantially all the sugar of the mash into alcohol. After fermentation is complete the entire mash is pumped into the still where the alcohol is separated from the mash by distillation. The distillation requires ordinarily not over one half hour and the temperature to which the mash is subjected is not over 212°. The liquid residue with insoluble grain particles in suspension constitutes the spent mash, which, as pointed out above, is either discharged to waste or dried and sold as cattle or poultry feed.

The spent mash contains the insoluble portions of the grain, substantially the entire protein and mineral content, some unconverted starch and unfermented sugar, and in addition a high percentage of yeast. As the mash forms a medium favorable to the growth of yeast there is in addition to the yeast added for fermentation, a substantial increase due to the growth of the yeast, which is quite rapid during the early stages of the fermentation before the alcohol concentration is sufficient to inhibit further cell growth.

A typical spent mash consists of approximately 94% liquid and 6% solids in suspension which may if desired be separated by sieving. The solid matter in suspension consists chiefly of the fibre of the grain and if an element of roughage is desired in the product the solid matter can be retained without adversely affecting the quality or taste of the product.

In carrying out our improved process, we proceed as follows:

Example I

Fifty gallons of the spent mash, with the grain particles strained out is placed in a steam jacketed tank. To the liquid we add ¼ to ½ per cent of salt (1 to 2 pounds); 2 to 3 grams of enzymes from the *Aspergillus oryzae*, commercially known as Clarase, and from 2 to 3 grams of the papaya fruit, dehydrated so as to preserve enzyme potency, together with 3 to 5 per cent of fresh yeast on the weight of the solids of the mash.

Sufficient suitable lime salt, or other alkaline salt or media is added to bring the average pH of 3.3 up to 5.6 and which is a pH suitable for preserving all of the B vitamin factors, after the yeast cell is broken down and its contents exposed to the pH of the liquid, that is, not too alkaline for the $B_1$ group and not too acid for the $B_2G$ group. Where the $B_1$ is mostly desired and a resultant syrup, particularly for use where a pH of around 3.3 is desired, we may not use the lime salt or salts of other alkaline media. The liquid is then heated to approximately fifty degrees centigrade and held at this temperature for from six to ten hours. It is then centrifuged to clean out the empty yeast cells, and then condensed in vacuo to a paste.

Example II

Instead of salt, as in Example I, we add 50 per cent of sugar calculated on the solids in the spent mash liquid. Less sugar depending on the sugar content of the product, as desired, can be used say down to twenty per cent of sugar on the weight of the solids. The centrifuged or filtered liquid may or may not be brought to boiling for from five to ten minutes, depending on whether such may be required for protection against spoilage, and depending on whether it is desired to preserve the enzymes into the finished product. For many uses the unboiled product is desirable. To this product, boiled or unboiled as desired, we add the enzymes and proceed as in Example I.

Where a meat-like flavor is desired, the product made with salt and not sugar, is preheated to boiling for about fifteen minutes, before drying. It may be drum dried instead of vacuum dried, since, here, the enzymes are not to be preserved.

The process may be variously modified. A very acceptable product can be made without employing the fresh yeast. As is well known, fresh yeast acts on the gluten of the grain and the addition of the fresh active yeast insures this enzymic action. Other enzymes may also be added, for example, digestive enzymes of animal origin such as are now available as packing house by-products in the form of concentrated extracts. Also, of course, other preparations of the *Aspergillus oryzae* than Clarase may be employed.

Instead of dehydrated papaya fruit, fresh fruit may be used, if suitably macerated. Instead of sugar in the form of sucrose we may use malt, malt extract, dextrose, or mixtures of these. In both Examples I and II the resultant digested product may be reduced to a paste or to a syrup or may be dried without filtration or centrifuging.

The procedure may also be modified by treating the spent mash successively instead of simultaneously with the several agents. The effect of the salt in Example I and the sugar in Example II, in addition to their functions of preserving and flavoring, is to autolyze the yeast, that is, to break down the yeast cells so as to liberate the cell contents to the action of the enzymes, and this autolyzing step may if desired be carried out before the addition of the enzymes.

It will also be understood that the examples given above are not intended to define the entire range of variations which may be made in the proportions of the various ingredients and in the times and temperatures of the respective operations. The processes specifically described produce the best products of the two types mentioned which have as yet been produced, but further experimentation may be produce further improvement within the scope of the invention.

We claim:

1. The method of making a food product which consists in adding to spent distillers' mash a yeast autolyzing agent and a substance containing the *Aspergillus oryzae* enzyme, maintaining the mash at a temperature favorable to the activity of the enzymes and thereafter concentrating by evaporation of the major portion of the contained water.

2. The method of making a food product which consists in adding to spent distillers' mash a yeast autolyzing agent and a substance containing the *Aspergillus oryzae* enzyme and the enzymes of fresh papaya fruit, maintaining the mash at a temperature favorable to the activity of the enzymes and thereafter concentrating by evaporation of the major portion of the contained water.

3. The method of producing a food product which consists in adding to the liquid of spent distillers' mash, salt in the order of one-half of one percent and enzymes from the *Aspergillus oryzae* in an amount approximating two to three grams to fifty gallons of mash, heating at approximately 50° C. and thereafter concentrating by evaporation of the major portion of the water of the mash under partial vacuum.

4. The method of producing a food product which consists in adding to the liquid of spent distillers' mash, salt in the order of one-half of one percent and enzymes from the *Aspergillus oryzae* in an amount approximating two to three grams to fifty gallons of mash and enzymes from fresh fruit in equivalent quantity, heating at approximately 50° C. and thereafter concentrating by evaporation of the major portion of the water of the mash under partial vacuum.

5. The method of producing a food product which consists in adding to the liquid of spent distillers' mash sugar in the order of 20–50% calculated on the solids of the spent mash liquid, enzymes from the *Aspergillus oryzae* in an amount approximating two to three grams to fifty gallons of mash, heating at approximately 50° C. and thereafter concentrating by evaporation of the major portion of the water of the mash under partial vacuum.

ROBERT McDOWELL ALLEN.
FREDERICK E. TIMMER.